US008462220B2

(12) United States Patent
Barna et al.

(10) Patent No.: US 8,462,220 B2
(45) Date of Patent: Jun. 11, 2013

(54) METHOD AND APPARATUS FOR IMPROVING LOW-LIGHT PERFORMANCE FOR SMALL PIXEL IMAGE SENSORS

(75) Inventors: Sandor L. Barna, Pasadena, CA (US); Scott P. Campbell, Thousand Oaks, CA (US); Gennady Agranov, Boise, ID (US)

(73) Assignee: Aptina Imaging Corporation, George Town (KY)

( * ) Notice: Subject to any disclaimer, the term of this patent is extended or adjusted under 35 U.S.C. 154(b) by 449 days.

(21) Appl. No.: 11/798,010

(22) Filed: May 9, 2007

(65) Prior Publication Data

US 2008/0278591 A1 Nov. 13, 2008

(51) Int. Cl.
| | | |
|---|---|---|
| H04N 5/225 | (2006.01) | |
| H04N 5/228 | (2006.01) | |
| H04N 5/217 | (2011.01) | |
| H04N 3/14 | (2006.01) | |
| H04N 5/335 | (2011.01) | |
| H01L 27/00 | (2006.01) | |

(52) U.S. Cl.
USPC ............. 348/216.1; 348/222.1; 348/241; 348/294; 348/302; 250/208.1

(58) Field of Classification Search
USPC ........ 348/216.1–218.1, 222.1, 240.99–240.2, 348/241–242, 248–250, 266–273, 294–324; 250/208.1; 382/276–284
See application file for complete search history.

(56) References Cited

U.S. PATENT DOCUMENTS

| | | | |
|---|---|---|---|
| 5,862,266 A | 1/1999 | Hunter | |
| 6,765,613 B1 | 7/2004 | Barna et al. | |
| 6,911,639 B2 * | 6/2005 | Boemler et al. | 250/208.1 |
| 7,091,466 B2 | 8/2006 | Bock | |
| 7,133,073 B1 * | 11/2006 | Neter | 348/272 |
| 7,982,788 B1 * | 7/2011 | Linzer et al. | 348/280 |
| 8,077,232 B2 * | 12/2011 | Hashimoto | 348/272 |
| 2001/0010554 A1 * | 8/2001 | Yoshida | 348/312 |
| 2001/0048474 A1 | 12/2001 | Yamazaki et al. | |
| 2003/0223003 A1 | 12/2003 | Meynants | |
| 2004/0070682 A1 | 4/2004 | Voss et al. | |
| 2004/0184670 A1 | 9/2004 | Jarman et al. | |
| 2004/0196396 A1 * | 10/2004 | Fujii et al. | 348/272 |
| 2005/0103977 A1 | 5/2005 | Krymski | |
| 2006/0077269 A1 | 4/2006 | Kindt et al. | |

(Continued)

FOREIGN PATENT DOCUMENTS

| | | |
|---|---|---|
| JP | 2001-292453 | 10/2001 |
| JP | 2005-20503 | 1/2005 |
| WO | WO 02/091424 A1 | 11/2002 |

OTHER PUBLICATIONS

Eric R. Fossum, "What to do With Sub-Diffraction-Limit (SDL) Pixels?—A Proposal for Gigapixel Digital Film Sensor (DFS)", IEEE CCE and AIS Workshop, 2005, pp. 214-217.

(Continued)

*Primary Examiner* — Michael Osinski
(74) *Attorney, Agent, or Firm* — Chih-Yun Wu (57) ABSTRACT

Method and apparatuses processing pixel values from a captured image include receiving an array of digital pixel values corresponding to a captured image, and computing a rolling sum of the array of pixel values. Computing a rolling sum includes selecting successive groupings of the pixel values, each grouping comprising N×M pixel values, summing pixel values in each of the successive groupings, and forming an output image using the summed pixel values.

21 Claims, 8 Drawing Sheets

U.S. PATENT DOCUMENTS

| | | | |
|---|---|---|---|
| 2006/0203113 A1* | 9/2006 | Wada et al. | 348/302 |
| 2006/0227228 A1* | 10/2006 | Nam | 348/272 |
| 2006/0238621 A1* | 10/2006 | Okubo et al. | 348/208.99 |
| 2006/0262210 A1 | 11/2006 | Smith et al. | |
| 2007/0110420 A1* | 5/2007 | Samadani et al. | 396/72 |
| 2008/0001975 A1* | 1/2008 | Obara | 345/694 |
| 2008/0205792 A1* | 8/2008 | Andersen | 382/299 |

OTHER PUBLICATIONS

International Preliminary Report and Written Opinion dated Nov. 19, 2009, issued in corresponding International Application No. PCT/US2008/062414.

* cited by examiner

METHOD AND APPARATUS FOR IMPROVING LOW-LIGHT PERFORMANCE FOR SMALL PIXEL IMAGE SENSORS

FIELD OF THE INVENTION

Disclosed embodiments relate generally to the field of pixel image sensors, and, more particularly, to improving low-light performance for small pixel image sensors.

BACKGROUND OF THE INVENTION

Digital image capture has received widespread acceptance by users of image capture equipment. Both still and video digital cameras, which use solid-state imagers or image sensors to capture images, are presently in widespread use. Common solid-state imagers, which have an array of pixels for image capture are based on CCD and CMOS technology, as well as others.

Figure 1:
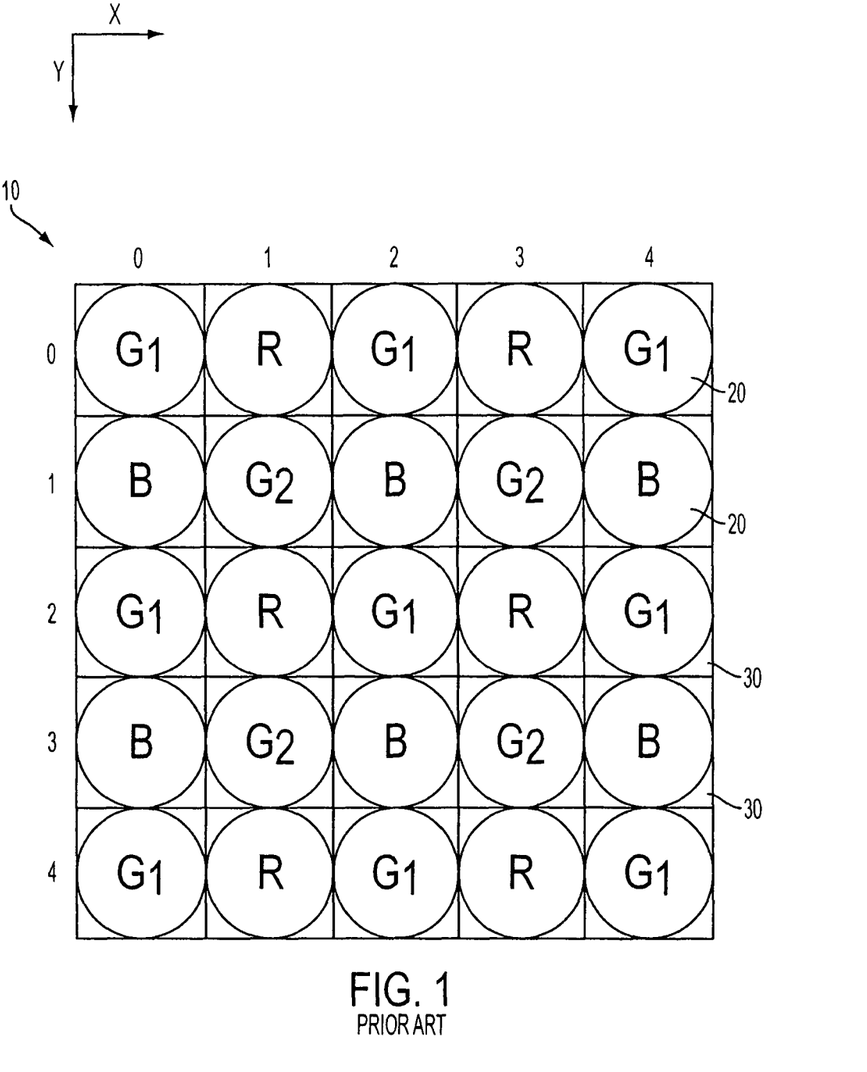
FIG. 1 is a top-down view of a conventional color filter array used in connection with an imager pixel array.

Color imagers typically output red/green/blue (RGB) color signals from a pixel array, since each imager pixel is typically covered by one of a red, green, or blue filter; arranged, for example, as in a conventional Bayer pattern, illustrated in FIG. 1. A Bayer pattern includes alternating rows with one row having alternating green pixels 20 and red pixels 20, and the next row having alternating blue pixels 20 and green pixels 20. This pattern repeats for the entire array 10. Imagers also exist which output monochromatic signals from a pixel array.

One problem confronted by solid-state imagers is the presence of noise in the captured image, particularly under low-light conditions, and/or where an ISO setting of a camera is set high, resulting in shorter image integration times. Image noise appears in a displayed or a printed image as a graininess in the image.

As pixels get smaller, more pixels are possible in a given area of silicon. This satisfies the market desire for higher resolution imagers at the same optical format. However, for the same amount of light striking the imager array, each of the pixels receives correspondingly less signal. This results in an apparent signal-to-noise ratio (SNR) reduction for the overall picture, often perceived as a reduction in overall low-light sensitivity and image quality. Because of this, conventional thinking is that smaller pixels are less desirable for low-light applications.

Accordingly, there is a need and desire for better images with improved signal-to-noise ratios for imagers with small pixels.

DETAILED DESCRIPTION OF THE INVENTION

In the following detailed description, reference is made to the accompanying drawings, which form a part hereof and show by way of illustration specific embodiments in which the invention may be practiced. These embodiments are described in sufficient detail to enable those skilled in the art to practice them, and it is to be understood that other embodiments may be utilized, and that structural, logical, processing, and electrical changes may be made. The progression of processing steps described is an example; however, the sequence of steps is not limited to that set forth herein and may be changed as is known in the art, with the exception of steps necessarily occurring in a certain order.

The term "pixel," as used herein, refers to a photo-element unit cell containing a photosensor for converting photons to an electrical signal. It should be understood that, taken alone, a pixel generally does not distinguish one incoming color of light from another and its output signal represents only the intensity of light received, not any identification of color. However, pixels 20 (FIG. 1), as discussed herein, are referred to by color (i.e., "red pixel," "blue pixel," etc.) when a color filter 30 (FIG. 1) is used in connection with the pixel array to pass a particular wavelength range of light, corresponding to a particular color, onto respective pixels 20. Accordingly, when the terms "red pixel" or "R" are used herein, they are referring to a pixel associated with and receiving light through a red color filter; when the terms "blue pixel" or "B" are used herein, they are referring to a pixel associated with and receiving light through a blue color filter; and when the terms "green pixel" or "G" are used herein, they are referring to a pixel associated with and receiving light through a green color filter. When the terms "$green_1$" or "$G_1$" are used herein, they are referring to a green pixel located in a row also populated by red pixels; when the term "$green_2$" or "$G_2$" are used herein, they are referring to a green pixel located in a row also populated by blue pixels.

The embodiments described herein are presented in the context of a CMOS imager, which is employed in a digital still or video camera to reduce noise in a captured image. However, this is but one example of an imager that may be used. Embodiments may be implemented using other image capture technologies such as, e.g., CCD. Indeed, embodiments can be implemented to reduce noise on any image captured by any image capturing technology, using the post-image capture digital processing techniques described herein.

Embodiments allow images from small pixels to be blurred in low light conditions to obtain a better resolution image with less apparent noise. The blurring is performed using a rolling sum, in which a summed pixel value is obtained for a group of pixel values, with each group rolling across and down a pixel value array, until all groups have been summed. In normal lighting conditions, until saturation, smaller pixels are better than larger pixels and give better resolution without a need for blurring. The rolling summation of pixel values reduces noise in low light conditions, and also reduces color aliasing. Embodiments also provide dynamic blurring, for instance, less blurring along edges or in portions of the image having more light.

Figure 2:
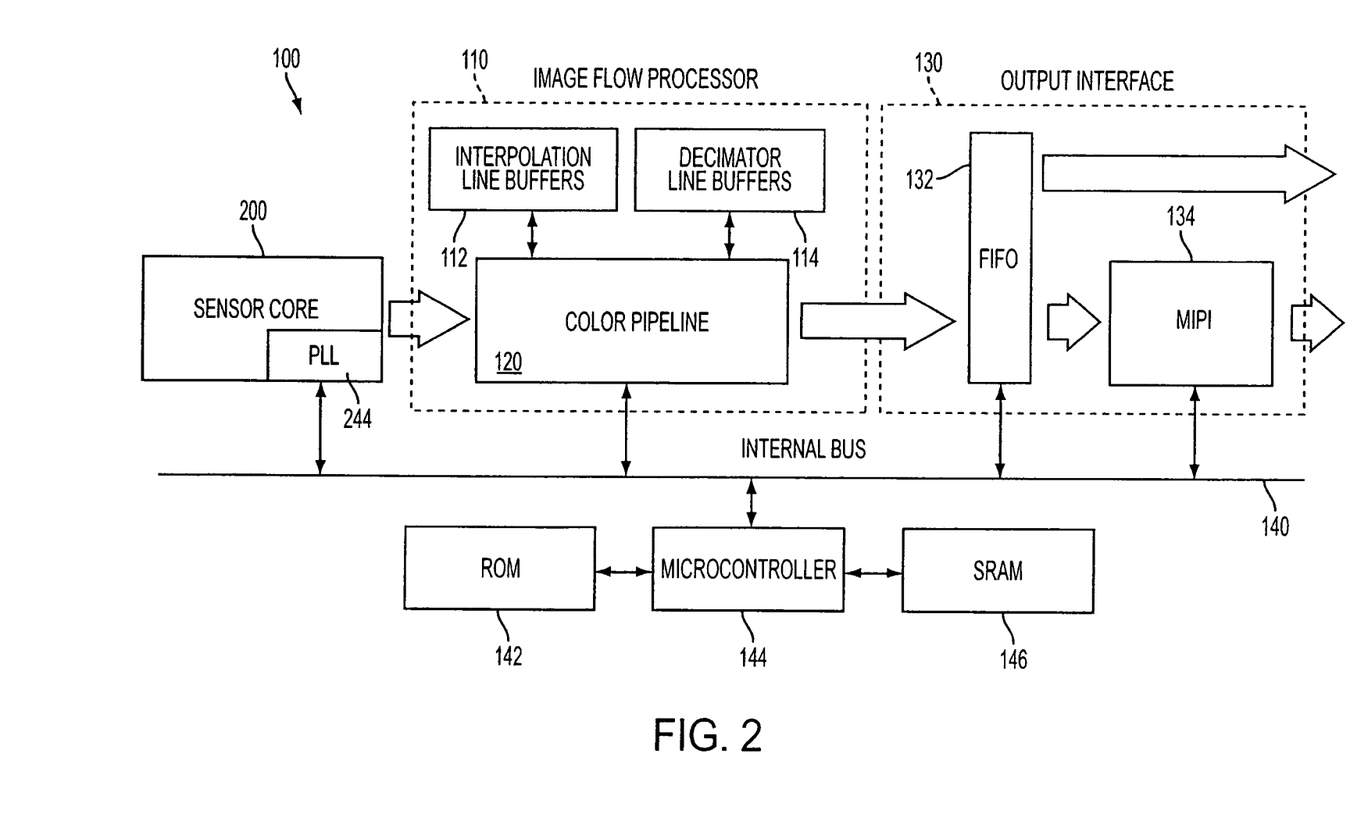
FIG. 2 is a block diagram of an imaging device which may implement an embodiment described herein.

Now referring to the figures, where like numerals designate like elements, FIG. 2 shows an embodiment of an image capture device 100. The FIG. 2 image capture device 100 may be implemented, though not required, as a system on a chip design, where all components illustrated are fabricated on a single integrated circuit. The image capture device 100 may use any type of image sensing technology, i.e., CCD, CMOS, etc.

The image capture device 100, in one example comprises a CMOS sensor core 200 that communicates with an image flow processor 110 that is connected to an output interface 130. A phase lock loop (PLL) 244 is used as a clock for the sensor core 200. The image flow processor 110, which is responsible for image and color processing, includes interpolation line buffers 112, decimator line buffers 114, and a color pipeline processor 120. One of the functions of the color pipeline processor 120 is to perform demosaicing, and other pixel processing operations, including noise reduction in accordance with the embodiments as more fully discussed below.

The output interface 130 includes an output first-in-first-out (FIFO) parallel buffer 132, and a serial Mobile Industry Processing Interface (MIPI) output 134, particularly where the image capture device 100 is used in a camera in a mobile telephone environment. The user can select either a serial output or a parallel output by setting registers in a configuration register within the image capture device 100 chip. An internal bus 140 connects read only memory (ROM) 142, a microcontroller 144 and a static random access memory (SRAM) 146 to the sensor core 200, image flow processor 110, and output interface 130.

Figure 3:
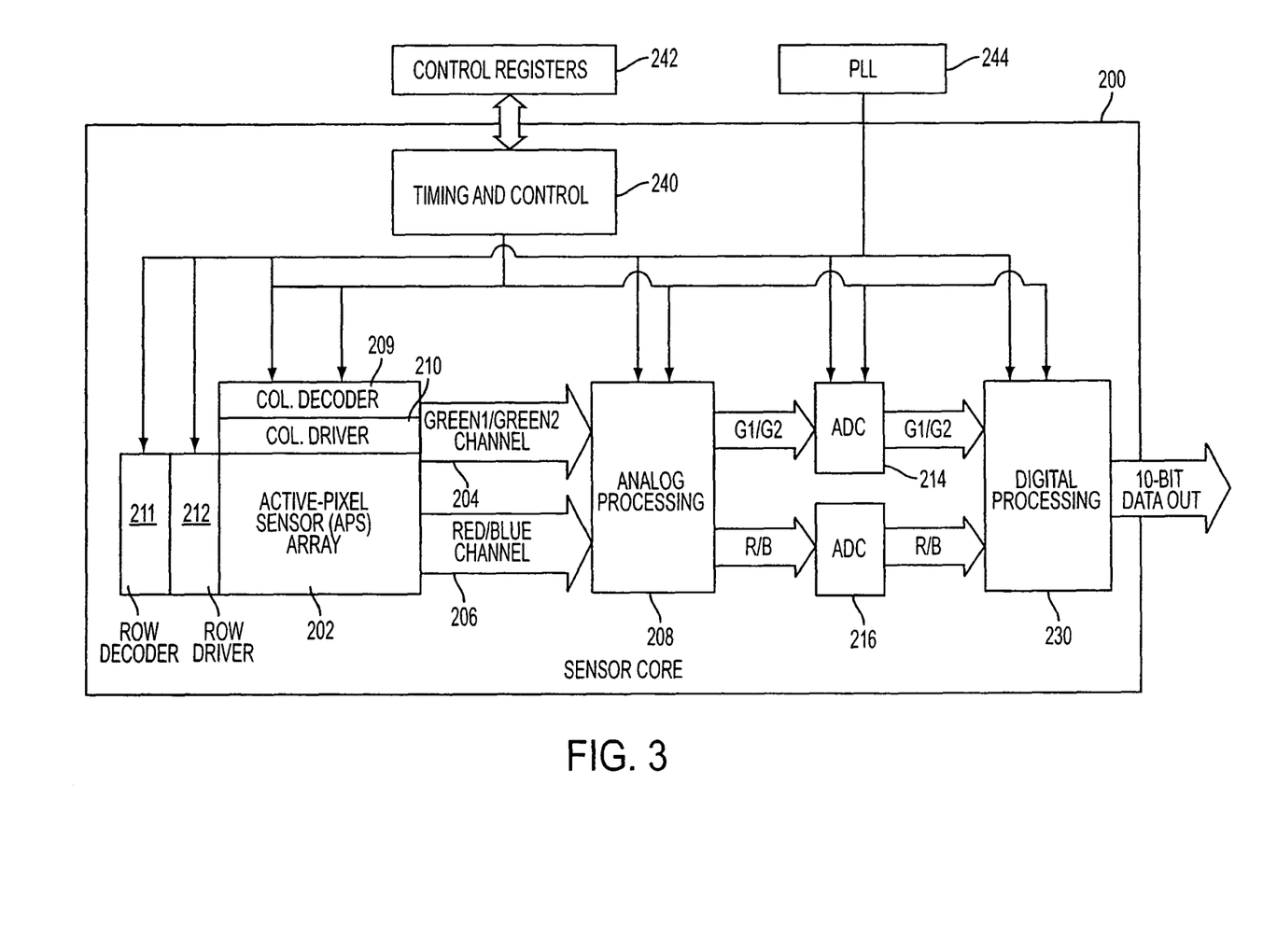
FIG. 3 is a block diagram of a sensor core depicted in FIG. 2.

FIG. 3 illustrates an exemplary sensor core 200 used in the FIG. 2 image capture device 100. The sensor core 200 includes in one embodiment a CMOS imager pixel array 202, although any type of solid state array core and associated readout circuitry may be used. Pixel array 202 is connected to analog processing circuit 208 by a $green_1/green_2$ channel 204 which outputs pixel signal values corresponding to two green channels of the pixel array, and through a red/blue channel 206 which contains pixel signal values corresponding to the red and blue channels of the array. Embodiments of the invention may also use monochromatic pixels.

Although only two channels 204 and 206 are illustrated, there are effectively four channels, since the $green_1$ and $green_2$ signals are read out at different times using channel 204, and the red and blue signals are likewise read out at different times using channel 206.

The analog processing circuitry 208 outputs RGB information as processed $green_1/green_2$ pixel signal values $G_1/G_2$ to a first analog-to-digital converter (ADC) 214 and processed red/blue signal values R/B to a second analog-to-digital converter 216. The outputs of the two analog-to-digital converters 214, 216 are sent to a digital processor 230, which forms a digital representation of a captured image.

In a CMOS imager, connected to, or as part of, the array 202, there are row and column decoders 211, 209 and row and column driver circuitry 212, 210 that are controlled by a timing and control circuit 240 to capture images using the array 202. The timing and control circuit 240 uses control registers 242 to determine how the array 202 and other components are controlled. As set forth above, the PLL 244 serves as a clock for the components in the core 200.

Pixel array 202 comprises a plurality of pixels arranged in a predetermined number of columns and rows. In operation, for a CMOS imager as an example of device 100, the pixels of each row and array are all turned on at the same time by a row select line and the pixels of each column within the row are selectively output onto column output lines by a column select circuit. A plurality of row and column lines are provided for the entire array 202. The row lines are selectively activated by row driver circuitry 212 in response to row address decoder 211 and column select lines are selectively activated by a column driver 210 in response to column address decoder 209. Thus, a row and column address is provided for each pixel. The timing and control circuit 240 controls the address decoders 211, 209 for selecting the appropriate row and column lines for pixel readout, and the row and column driver circuitry 212, 210, which apply driving voltages to the drive transistors of the selected row and column lines.

Each column contains sampling capacitors and switches in the analog processing circuit 208 that read a pixel reset signal $V_{rst}$ and a pixel image signal $V_{sig}$ for selected pixels. Because the core 200 uses $green_1/green_2$ channel 204 and a separate red/blue channel 206, circuitry 208 will store $V_{rst}$ and $V_{sig}$ signals for each of the green, red, and blue pixel signals as they are read out. A differential signal $(V_{rst}-V_{sig})$ is produced for each pixel by differential amplifiers contained within the circuitry 208 for each pixel output signal. Thus, the signals $G_1/G_2$ and R/B are differential signals representing respective pixel brightness values that are digitized by a respective analog-to-digital converter 214, 216. The analog-to-digital converters 214, 216 supply the digitized $G_1/G_2$ and R/B pixel signal values to the digital processor 230 which forms the digital image output (e.g., a 10 bit digital output). The output is sent to the image flow processor 110 (FIG. 2) for further processing. The image flow processor 110 will, among things, perform color correction, and other adjustments on the captured image digital pixel values applied thereto.

Although the sensor core 200 has been described with reference to use of a CMOS imager pixel array, this is merely one type of sensor core that may be used. Other sensor cores having a different readout architecture may also be used. For example, a CCD core could be used, which supplies pixel signal values for processing to an image flow signal processor 110. The color pipeline processor 120 of the image flow processor 110, which may be implemented as hardware circuits, a programmed processor, or a combination of hardware circuits and a programmed processor, performs a number of operations on the pixel signal values received thereat, one of which is selective noise reduction.

For purposes of simplifying the present description, the following embodiments are described below in connection with reducing noise in an image captured under low light conditions. Noise reduction is performed by performing rolling sums on groupings of pixel values of a captured image such that each group sum functions as a larger pixel value.

If the pixel parameters for an array of small pixels scale to the small size in an ideal way (quantum efficiency and crosstalk do not change, well-depth reduces linearly with pixel area), more information about the image striking the array may be collected. As a result, a higher quality final image is possible. It is possible to reconstruct a higher quality image by trading some of the sensor core image resolution for an improved signal-to-noise ratio (SNR) in the processed image. This technique works best when the electronic read noise of the image is negligible compared to the Poisson shot noise seen at each pixel.

Figure 4:
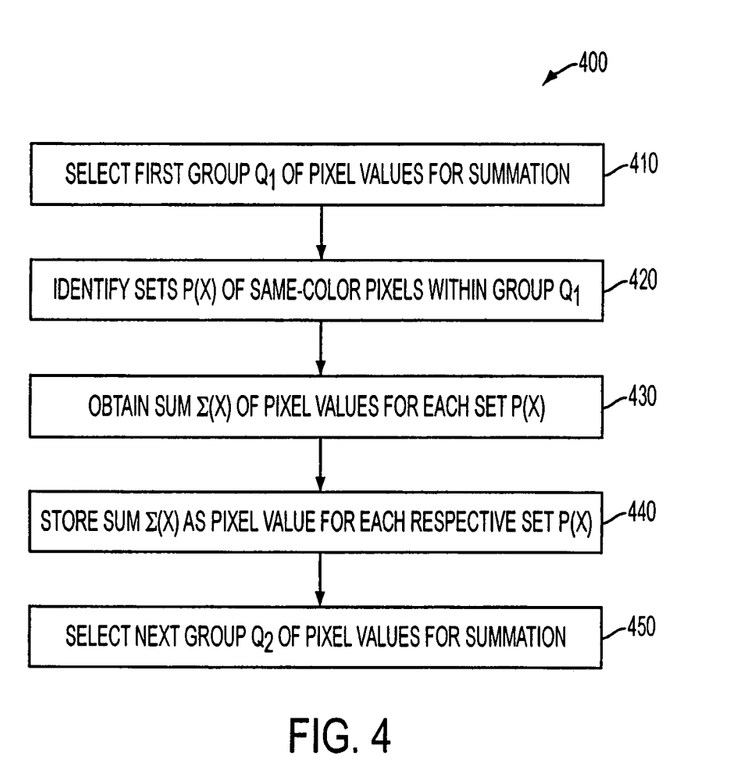
FIG. 4 is a flowchart of a process according to an embodiment of the invention.

FIG. 4 is a flowchart of a process 400 for forming rolling pixel sums according to one embodiment performed in the color pipeline processor 120 of image flow signal processor 110. A first grouping (or cluster or set) of pixel values $Q_1$ of size N×N pixels is selected (step 410). For example, N may equal 4 for a 4×4 grouping of pixel values. Next, within the grouping $Q_1$, same-color sets P(X) of same-color pixel values are identified (step 420). For example, if using a color image sensor, four same-color sets P(X) may be identified, one for each color (i.e., $P(G_1)$, $P(G_2)$, P(R), P(B)). The pixel values for each same-color set P(X) are added together (step 430), and the resulting sum Σ(X) is stored as the pixel value for each respective same-color set P(X) (step 440). Subsequently, the next grouping of pixels $Q_2$, adjacent to the first grouping $Q_1$, and one pixel value over in a horizontal direction, is selected for summation (step 450), and steps 420 through 450 are repeated until all possible groupings through grouping $Q_n$ have been processed across the rows of an array of pixel values. The process is also repeated by moving the pixel group selection in a vertical direction down one row and again summing across the rows of an array of pixel values. Thus, a rolling sum of digitized pixel values for each pixel color is achieved for the first row from left to right, then for the next row down from left to right, and so on. Embodiments are not limited to the above-described order for the rolling sum. The rolling sum produces an array of summed pixel values, each sum now representing a new pixel value in an array of image pixel values.

Although the process 400 is described using a Bayer color space, other color spaces (i.e., YUV) may also be used, as well as other color sets. For example, a single green set P(G) may be used, rather than $P(G_1)$ and $P(G_2)$. As noted, process 400 may be implemented by the color pipeline processor 120.

Figure 5A:
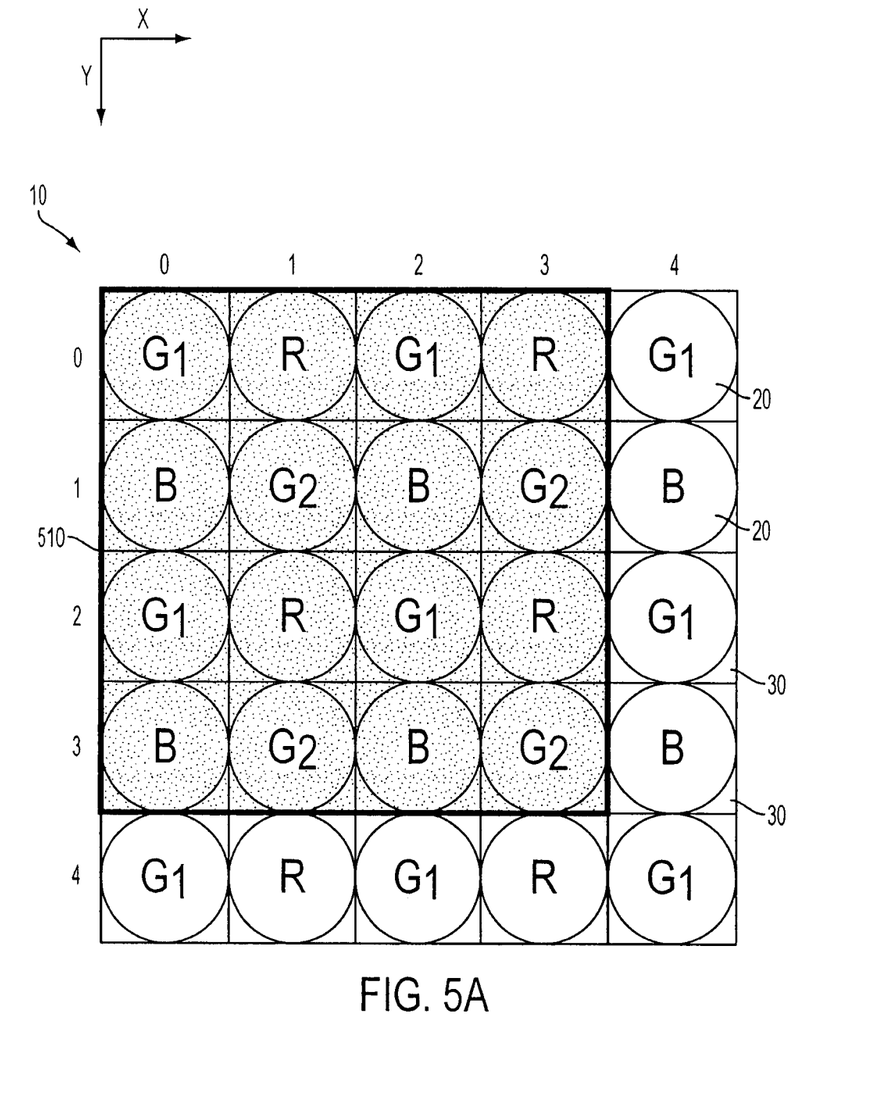
FIGS. 5A-5C are top-down views of the conventional color filter array of FIG. 1, illustrating operation of the process of FIG. 4.
Figure 5B:
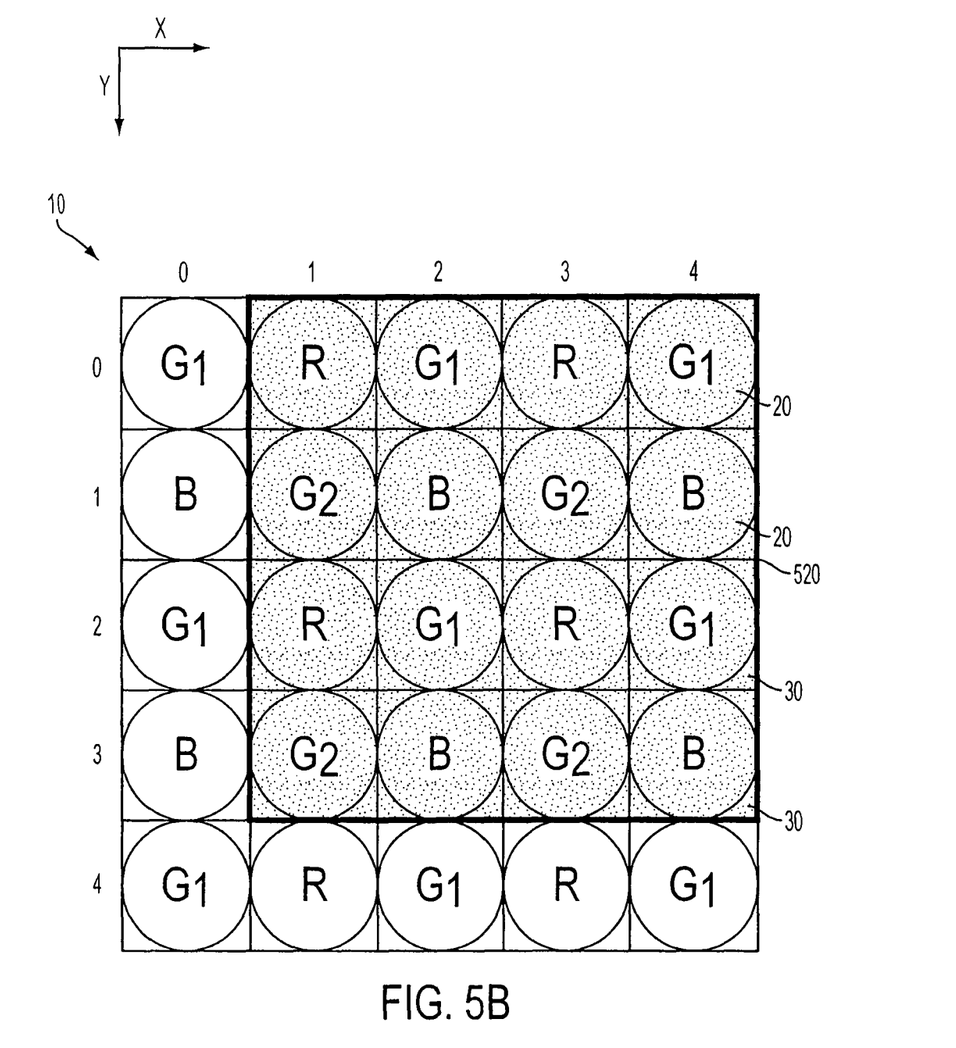
Figure 5C:
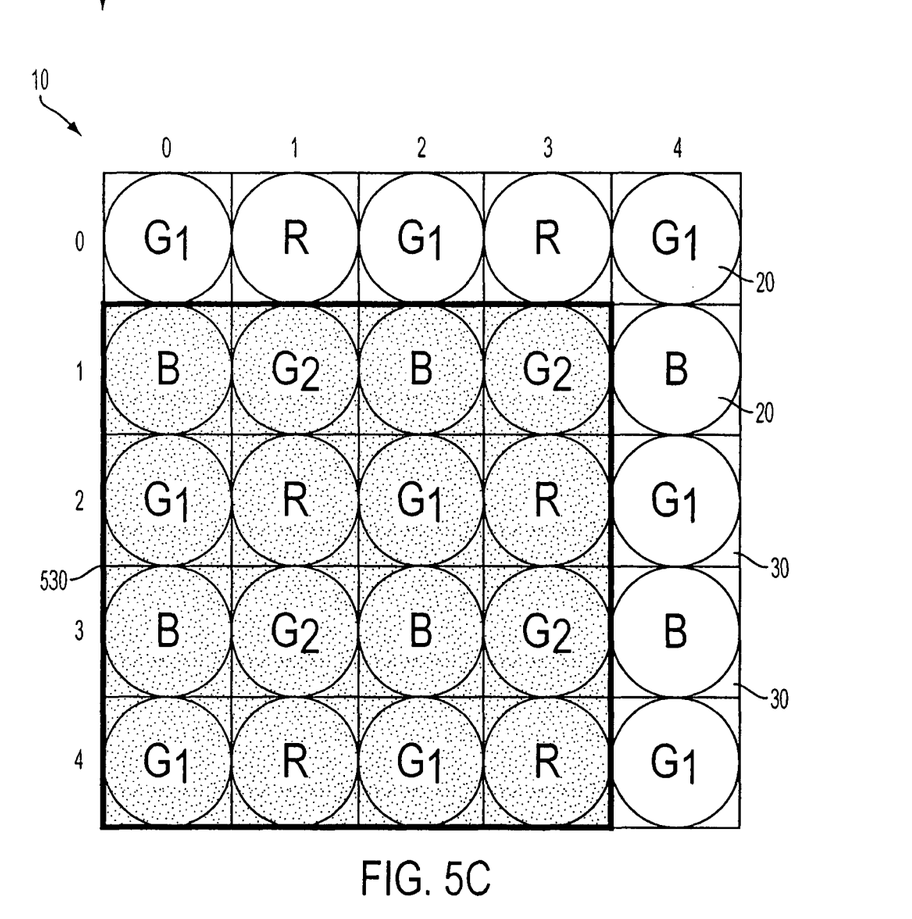

FIGS. 5A-5C illustrate how the process 400 (FIG. 4) may be implemented using color pixel values, in which the four different colors $G_1$, $G_2$, R, B of array 10 may be grouped independently. In the illustrated example, the N×N size of $Q_1$ is selected to be a 4×4 array. For example, for 4×4 rolling sums and Bayer patterns, FIG. 5A includes grouping 510, in which the sums for each color are made according to the pixels 20 as listed below in Table 1. FIG. 5B includes grouping 520, shifted right by one pixel value, in which the sums for each color are made according to the pixels 20 as listed below in Table 2. FIG. 5C includes grouping 520, shifted left by one pixel value and down by one pixel, in which the sums for each color are made according to the pixels 20 as listed below in Table 3.

TABLE 1

Grouping 510

| Pixel | Coordinates |
|---|---|
| $G_1$ | (0,0), (2,0), (0,2), (2,2) |
| R | (1,0), (3,0), (1,2), (3,2) |
| B | (0,1), (2,1), (0,3), (2,3) |
| $G_2$ | (1,1), (3,1), (1,3), (3,3) |

TABLE 2

Grouping 520

| Pixel | Coordinates |
|---|---|
| R | (1,0), (3,0), (1,2), (3,2) |
| $G_1$ | (2,0), (4,0), (2,2), (4,2) |
| $G_2$ | (1,1), (3,1), (1,3), (3,3) |
| B | (2,1), (4,1), (2,3), (4,3) |

TABLE 3

Grouping 530

| Pixel | Coordinates |
|---|---|
| B | (0,1), (2,1), (0,3), (2,3) |
| $G_2$ | (1,1), (3,1), (1,3), (3,3) |
| $G_1$ | (0,2), (2,2), (0,4), (2,4) |
| R | (1,2), (3,2), (1,4), (3,4) |

Same-color pixel values (e.g., $G_1$, $G_2$, R, B) for each grouping 510, 520, 530, are summed, which represents a respective new pixel value of four color component values for each grouping. As such, the values of sixteen smaller pixel values in each grouping 510, 520, 530 effectively become four larger pixel values, each corresponding to one color $G_1$, $G_2$, R, B. The summed value replaces each original small pixel in turn. The size of the groupings may vary, but are preferably square (e.g., 3×3, 20×20, etc.), and may even vary by color, so that, for example, a blue grouping is larger than a red grouping. Selection of grouping sizes may performed by, e.g., microcontroller 144, and may be made in response to predetermined detected conditions, for example, one or more of lighting conditions, lens characteristics, and known noise conditions, or meeting an upper or lower threshold of one or more of these conditions. Such predetermined conditions may be selected according to, e.g., exposure time, automatic exposure algorithms, scene content, and automatic white balancing algorithms. A basic algorithm may be pre-programmed, and modifications may be made, for example, by adjusting tuning registers or including parameter look-up tables in a memory. The same types of determinations may be made to turn the rolling sum process on or off, i.e., the rolling sum occurs when detected light is lower than a threshold value.

Selection of grouping sizes, i.e., the number of pixels in a grouping, may also be dynamically altered based on the position of the grouping or other reasons. For example, a smaller grouping may be used at the center of the array, and increasing in size toward the periphery of the array to compensate for pixel shading and lens shading. As another example, it may be desired to reduce the kernel going from the center of the array to periphery to compensate for modulation transfer function (MTF) degradation of the camera system, e.g., the reduction of the MTF at some or all spatial frequencies.

Additional pixel processing, such as demosaicing, white balancing, etc. may be performed by color pipeline processor 120 either before or after the process 400. If demosaicing is performed before the process 400, the demosaiced pixel values, each having red, green, and blue components, may be treated in the manner described below. If the additional pixel processing is performed after the process 400, the total number of final groupings for large pixel values for each color may preferably be equal, but may vary according to the requirements of such additional processing.

In this manner, the average signal-to-noise ratio per pixel may be improved by a factor of N relative to the signal-to-noise ratio preprocessing, where N is the size of an N×N array $Q_1$. Although the image resolution may be degraded, the end result may be a significantly higher perceived resolution than that which could be achieved by a large pixel having the same size as the N×N array because of the achieved noise reduction.

The process 400 may be performed for color or monochrome pixels. If monochrome pixel values or demosaiced pixel values are being processed, then step 420 may be omitted, and the process would advance directly to step 430 from step 410, as there is no need to identify discrete color. In embodiments using monochromatic pixels, $N^2$ pixel values (an array of N×N pixel values) from (0,0) to (N,N) are summed digitally after readout to generate the first pixel value (0,0). The second pixel value (1,0) is then generated in the same way by summing the pixel value array from (1,0) to (N+1,N). Likewise, pixel value (0,1) would be generated from the sum of the array from (0,1) to (N,N+1). For demosaiced images, the summation is the same, but each separate color component is summed. That is, each summed pixel value will have a three-color component summation of all the red, blue, and green pixel color values with the pixel group. Alternately, a four-color component summation of red, blue, $green_1$, and $green_2$ pixel values may be employed. If should be noted that, although embodiments have been described using an N×N pixel value grouping, that the pixel value grouping need not be square, and other N×M pixel value groupings, when N and M are unequal integers, may be used. In addition, successive groupings may differ by location, number, pattern, shape, size, or a combination of any of location, number, pattern, shape, or size.

Figure 6:
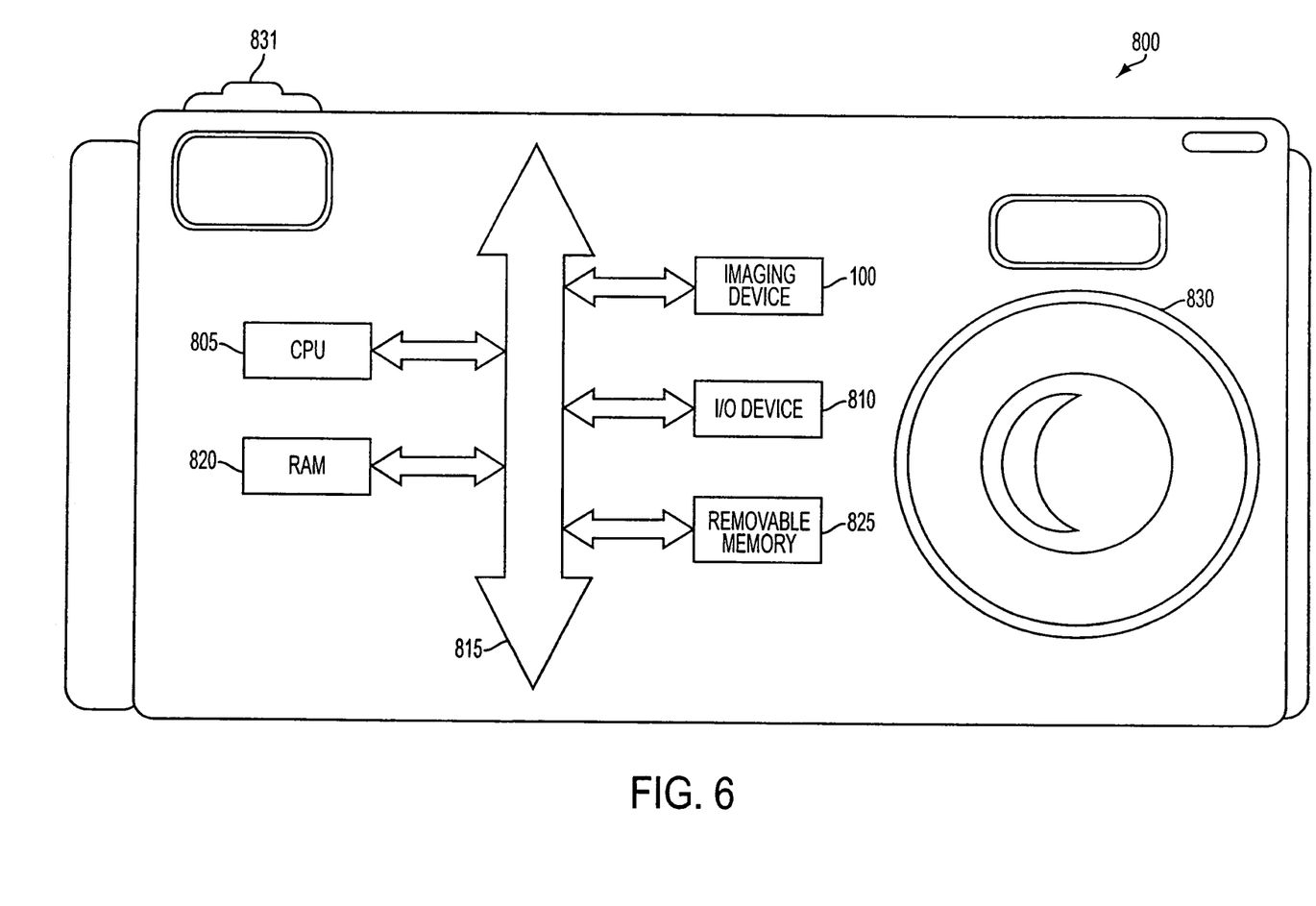
FIG. 6 is an embodiment of a camera system that can be used with the FIG. 2 imaging device.

FIG. 6 is an embodiment of a camera system 800, which can use the FIG. 2 image capture device 100 having a color pipeline processor 120 capable of implementing process 400 according to an embodiment. For a monochrome image, color pipeline processor 120 may be adapted to process monochrome images. Camera system 800, for example, a still or video camera system, which generally comprises a lens 830 for focusing an image on the pixel array 202 (FIG. 2) when shutter release button 831 is depressed, a central processing unit (CPU) 805, such as a microprocessor for controlling camera operations, that communicates with one or more input/output (I/O) devices 810 over a bus 815. Image capture device 100 also communicates with the CPU 805 over bus 815. The system 800 also includes random access memory (RAM) 820, and can include removable memory 825, such as flash memory, which also communicate with CPU 805 over the bus 815. Image capture device 100 may be combined with a processor, such as a CPU, digital signal processor, or microprocessor, with or without memory storage on a single integrated circuit or on a different chip than the processor.

The camera system 800 is one example of a system having digital circuits that could include image sensor devices. Without being limiting, such a system could instead include a computer system, scanner, machine vision, vehicle navigation, video phone, surveillance system, auto focus system, star tracker system, motion detection system, image stabilization system, and other image acquisition and processing system.

The processes and devices in the above description and drawings illustrate examples of methods and devices of many that could be used and produced to achieve the objects, features, and advantages of embodiments described herein. For example, embodiments include stand-alone image processing programs performed in a computer. In addition, the groupings of pixel values $Q_1$ may be of any pattern, shape, or number of pixels. Also, in the rolling sum, a subsequently selected grouping does not need to be only one pixel value removed from a prior grouping in a horizontal and/or vertical direction, as pixel values can be skipped over in the rolling pixel value grouping in one or more of the horizontal or vertical direction of the rolling sum. Moreover, embodiments include a machine-implemented storage medium containing a program executed by a processor for implementing the processing described herein. Thus, the embodiments are not to be seen as limited by the foregoing description of the embodiments, but only limited by the appended claims.

What is claimed as new and desired to be protected by Letters Patent of the United States is:

1. A method of processing pixel values from a captured image, the method comprising:
   receiving an array of digital pixel values corresponding to a captured image; and
   computing a rolling sum of the array of pixel values using each digital pixel value of the array of digital pixel values, wherein computing a rolling sum comprises:
      selecting successive groupings of the pixel values, wherein each grouping is a consecutive portion of the array of digital pixel values and comprises N×M pixel values, wherein the center locations of successive groupings of pixel values are displaced by one pixel value in a first direction of the array, and wherein at least one of the pixels in each grouping is included in at least one other grouping;
      summing all pixel values in each of the successive groupings to form at least a first summed pixel value and a second summed pixel value; and
      forming an output image using at least the first summed pixel value and second summed pixel values.

2. The method of claim 1, wherein the successive groupings of pixel values are displaced by one pixel value in a second direction of the array.

3. The method of claim 1, wherein the rolling sum is computed in response to a predetermined detected lighting condition.

4. The method of claim 1, wherein the rolling sum is computed in response to a predetermined lens characteristic.

5. The method of claim 1, wherein the rolling sum is computed in response to a predetermined detected noise condition.

6. The method of claim 1, wherein the array of pixel values comprises an array of monochromatic pixel values.

7. The method of claim 1, wherein the array of pixel values comprises an array of red, blue, and green pixel values.

8. The method of claim 1, wherein:
   the array of pixel values comprises an array of demosaiced pixel values; and
   the summing comprises separately summing same-color components within a grouping.

9. The method of claim 1, wherein the summing of pixel values comprises separately summing same-color pixel values within a grouping.

10. A method of reducing noise in a captured image comprising:
   receiving an array of digital pixel values corresponding to a captured image;
   selecting a first set of pixel values, wherein the first set of pixel values is a consecutive portion of the array of digital pixel values and comprises M×N pixel values;
   summing all pixel values of the first set of pixel values to form at least a first summed pixel value;
   selecting a second set of pixel values;
   computing a second summed pixel value for the second set of pixel values; and
   forming an output image using the summed pixel values, wherein selecting the first set of pixel values comprises selecting a size of the first set of pixel values based on a predetermined noise condition, wherein selecting the second set of pixel values comprises selecting a size of the second set of pixel values based on the predetermined noise condition, and wherein the size of the first set of pixel values is different from the size of the second set of pixel values.

11. An apparatus for processing pixel values in a captured image comprising:
   a processing circuit configured to calculate a rolling sum of an array of digital pixel values corresponding to a captured image using each digital pixel value of the array of digital pixel values, wherein calculating the rolling sum comprises:
      selecting successive clusters of the pixel values, wherein each cluster is a consecutive portion of the array of digital pixel values and comprises N×M pixel values, wherein center locations of the successive clusters of pixel values are displaced by one pixel value in a first direction of the array, and wherein at least one of the digital pixel values in each cluster is included in at least one other cluster;

summing all pixel values in each of the successive clusters to form at least a first summed pixel value and a second summed pixel value; and forming an output image using at least the first summed pixel value and second summed pixel value.

12. The apparatus of claim 11, wherein the successive clusters of pixel values are displaced by one pixel value in a second direction of the array.

13. The apparatus of claim 11, wherein the rolling sum is computed in response to a predetermined detected lighting condition.

14. The apparatus of claim 11, wherein the rolling sum is computed in response to a predetermined a lens characteristic.

15. The apparatus of claim 11, wherein the rolling sum is computed in response to a predetermined detected noise condition.

16. The apparatus of claim 11, wherein the array of pixel values comprises an array of monochromatic pixel values.

17. The apparatus of claim 11, wherein the array of pixel values comprises an array of red, blue, and green pixel values.

18. The apparatus of claim 11, wherein the summing of pixel values comprises separately summing same-color pixel values within a cluster.

19. An imaging system comprising:

a pixel array and readout circuit for capturing image data;

a receiving circuit configured to receive an array of digital pixel values corresponding to a captured image from the readout circuit; and a processing circuit configured to:

select successive groupings of pixel values of the array of pixel values, wherein each grouping is a consecutive portion of the array of digital pixel values and comprises N×M pixel values, where N and M are integers, wherein the centers of successive groupings of pixel values are displaced by one pixel value, and wherein at least some of the pixel values in each of the groupings are included in at least one other grouping;

sum all pixel values in each of the successive groupings to form at least a first summed pixel value and a second summed pixel value; and form an output image using at least the first summed pixel value and second summed pixel value, wherein the output image represents the entire array of pixel values.

20. The imaging system of claim 19, wherein the imaging system comprises a digital camera.

21. The imaging system of claim 20, further comprising a lens for focusing an image on the pixel array.

* * * * *